United States Patent [19]
Stansfield et al.

[11] Patent Number: 4,907,096
[45] Date of Patent: Mar. 6, 1990

[54] IMAGE PROCESSING

[75] Inventors: Peter W. Stansfield, Hatfield; Alastair Reed, Leighton Buzzard, both of England

[73] Assignee: Crosfield Electronics Limited, London, England

[21] Appl. No.: 226,693

[22] Filed: Aug. 1, 1988

[30] Foreign Application Priority Data

Jul. 30, 1987 [GB] United Kingdom ................. 8718100

[51] Int. Cl.⁴ ............................................. H04N 1/40
[52] U.S. Cl. ..................................... 358/456; 358/458; 358/447
[58] Field of Search ........................ 358/456, 458, 447

[56] References Cited

U.S. PATENT DOCUMENTS

| | | | |
|---|---|---|---|
| 4,194,221 | 3/1980 | Stoffel | 358/456 |
| 4,288,821 | 9/1981 | La Vallee et al. | 358/456 |
| 4,433,346 | 2/1984 | Stoffel et al. | 358/456 |
| 4,630,125 | 12/1986 | Roetling | 358/456 |

FOREIGN PATENT DOCUMENTS

| | | |
|---|---|---|
| 24902 | 7/1981 | European Pat. Off. . |
| 74795 | 9/1983 | European Pat. Off. . |
| 195563 | 1/1986 | European Pat. Off. . |
| 3344694 | 2/1985 | Fed. Rep. of Germany . |
| 3546136 | 11/1986 | Fed. Rep. of Germany . |

Primary Examiner—Edward L. Coles, Sr.
Attorney, Agent, or Firm—Sughrue, Mion, Zinn, Macpeak & Seas

[57] ABSTRACT

A method and apparatus for processing a screened separation comprises an analyze scanner for scanning the separation at a resolution higher than the screen ruling to generate a binary value for each high resolution pixel of the separation; a processor for generating signals representing single values for respective blocks of the high resolution pixels from the binary data in the blocks; and a descreening system to which the signals from the processor are fed, the descreening system generating signals representing a descreened version of the original separation.

6 Claims, 2 Drawing Sheets

IMAGE PROCESSING

FIELD OF THE INVENTION

The invention relates to apparatus and methods for descreening a screened separation.

DESCRIPTION OF THE PRIOR ART

In the graphics arts, screened separations are often input scanned (or digitised) using a binary input device for transmission purposes. Such a binary input device will scan the separation at a relatively high resolution (significantly higher than the screen ruling) and generate for each high resolution pixel a binary value. This enables separations to be transmitted using run length encoding and the like and subsequent reconstruction at a remote site.

However, if the separations which are to be reconstructed are required to be at a different screen angle or ruling to the original screen angle then moire patterning will appear. A solution to this problem is to remove the original screen effects while retaining the picture information, and then to apply the new screen. One method of descreening is described in our copending U.S. patent application Ser. No. EP-A-0195563. This consists of applying a suitably shaped frequency filter to the screened image which is scanned in as a greylevel image.

Typically, in order to resolve the screen separation in a binary form, a scan having about six times the resolution of a normal grey level scan is required. With two grey level samples per half-tone dot, an area of approximately 9×9 graphics pixels has to be considered for good filtering. If the method described in the above European patent application was applied directly to a binary scan, this would imply a 63×63 binary pixel area would be required. This in turn implies the need for 3969 additions for each output pixel and would be very difficult to implement in real time.

SUMMARY OF THE INVENTION

In accordance with one aspect of the present invention, image processing apparatus comprises analysing means for scanning an original screened colour separation at a resolution higher than the screen ruling to generate a binary value for each high resolution pixel of the separation; processing means for generating signals representing single values for respective blocks of the high resolution pixels from the binary data in the blocks; and descreening means to which the signals from the processing means are fed, the descreening means generating signals representing a descreened version of the original separation.

In accordance with a second aspect of the present invention, a method for processing a screened colour separation comprises scanning the screened separation at a resolution higher than the screen ruling to generate a binary value for each high resolution pixel of the separation; generating signals representing single values for respective blocks of the high resolution pixels from the binary data in the blocks; and descreening the resultant low resolution version of the separation.

The invention deals with the problems outlined above by converting the high resolution binary version of the image to a relatively low resolution grey level image. This is achieved by dividing the binary representation into a number of blocks of high resolution pixels, each block constituting a low resolution pixel.

In general the blocks will abut one another although they could also overlap.

Typically, the binary values in each block are summed to generate the resultant single value for the block.

In general, the blocks will be two dimensional and typically square. In one particular example, the blocks have dimensions 6×6 high resolution pixels.

In the case where each block comprises 6×6 high resolution pixels, this would require 36 additions to generate the low resolution grey level value. Subsequently, a 9×9 window is applied to the grey level data, requiring another 81 additions and 81 multiplications, which is quite feasible in real time, to generate the descreened version.

Typically, the processing means will be constituted by a suitably programmed computer.

The descreened image can be used to generate continuous tone separations or be rescreened.

DE-A No. 3546136 discloses a system for resizing a binary image which has some similarities with the present invention. This system applies a conventional "unsharp masking process" to the image after an averaging process to sharpen the image following which the image is made binary again, having changed the screen. This is not the same as in the invention where the low resolution version is descreened.

BRIEF DESCRIPTION OF THE DRAWINGS

Some examples of methods and apparatus in accordance with the present invention will now be described with reference to the accompanying drawings, in which.

DETAILED DESCRIPTION OF THE EMBODIMENTS

A typical coloured image is represented in the printing industry by a number of monochrome separations representing the colour content of the original picture in terms of printing colour components, for example, cyan, magenta, and yellow. It is common to represent such separations as half-tone or screened separations in which the density of the colour component is represented by discrete half-tone dots of varying size. The dots are laid down centred on a predetermined screen ruling and this artificial screen needs to be removed (descreened) to enable the separation to be reconstituted with the screen at a different angle.

Figures 1, 2:
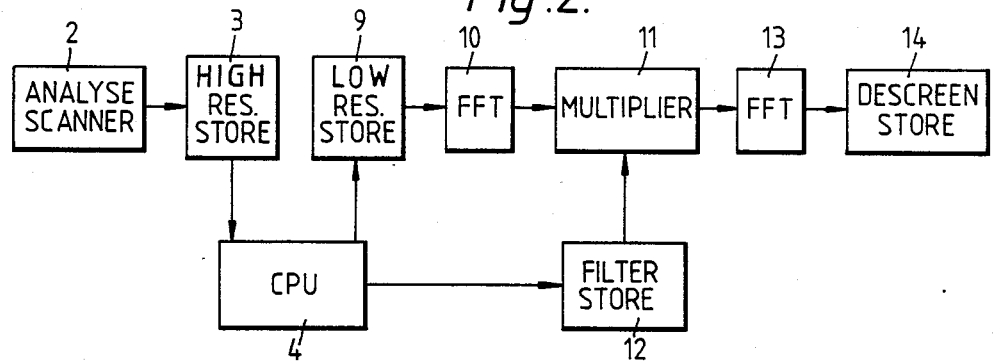
FIG. 1 is an enlarged schematic diagram of part of a digital representation of a colour separation.
FIG. 2 illustrates in block diagram form one example of apparatus in accordance with the invention; and, FIG. 3 is a flow diagram illustrating one example of a method according to the invention.

As mentioned above, we have already proposed a method for achieving descreening using an analyse scanner which generates a grey scale, low resolution version of the separation scanned. In the present case, the screened separation is represented at high resolution in a binary form. FIG. 1 illustrates an example of part of a colour separation divided by dashed lines into high resolution pixels 1. The analyse scanner used to generate such a representation is indicated schematically at 2 in FIG. 2 and generates for each high resolution pixel a binary value of 0 or 1 depending on whether that pixel is white or black respectively. In a typical process, the high resolution binary pixels will have a size of 1/2000 inch × 1/2000 inch while the half-tone or graphics pixels of the screened image (separation) will be in the order of 1/300 inch × 1/300 inch.

Figure 3:
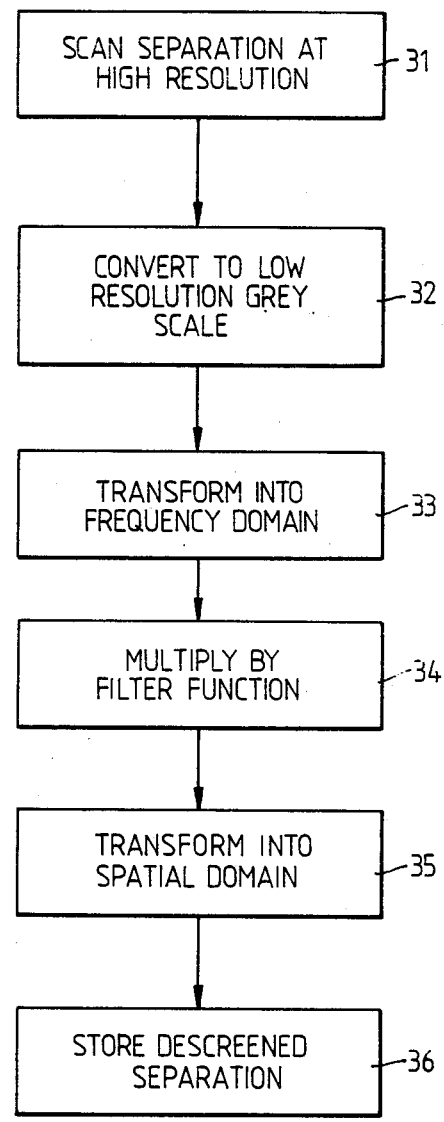

The analyse scanner 2, which may for example be associated with a flat bed scanning system on which the separation is mounted, scans the entire separation (step 31 in FIG. 3) so as to generate a complete binary representation of the separation which is stored in a high resolution store 3. A microcomputer 4 then scans the high resolution data in the store 3 by stepping a window having dimension 6 × 6 high resolution pixels across the stored version. FIG. 1 illustrates in solid lines four different positions 5–8 for the window. In each position of the window, the binary values within the window are summed. For example, when the window is positioned at position 5 in FIG. 1 the contents of the high resolution pixels are summed to generate a value of 18. The window is then moved to position 6 and a similar summation carried out to yield a value of 22. The summations for positions 7 and 8 will be 16 and 17 respectively. The resultant summations are stored in a low resolution store 9 which will eventually contain a low resolution, grey level representation of the original separation. (Step 32).

This low resolution, grey level representation separation can then be descreened either in the spatial domain or in the transform domain using any known descreening system such as those described in EP-A No. 0195563 the disclosure of which is incorporated herein by reference.

It is preferred to carry out descreening in the transform domain in which case the content of the low resolution store 9 is fed typically in overlapping 128 × 128 low resolution pixel blocks to a fast fourier transform (FFT) circuit 10 for conversion into the frequency domain (step 33). The output signals from the circuit 10 are fed to a multiplier circuit 11 where the data is multiplied by digital data from a filter store 12 representing a low pass filter in the frequency domain. (Step 34).

The resultant multiplied data is then inversely transformed back into the spatial domain by a further FFT circuit 13 (Step 35) and stored in a store 14 (Step 36).

We claim:

1. Image processing apparatus comprising analysing means for scanning an original screened colour separation at a resolution higher than the screen ruling to generate a binary value for each high resolution pixel of said separation; processing means for generating signals representing single values for respective blocks of said high resolution pixels from said binary values in said blocks; and descreening means to which said signals from said processing means are fed, said descreening means generating signals representing a descreened version of said original separation.

2. Apparatus according to claim 1, wherein said processing means is adapted to sum said binary values for each high resolution pixel in each block to generate said single values.

3. Apparatus according to claim 1, wherein said processing means comprises a high resolution store for storing said high resolution pixel values; a microcomputer for generating said block signals; and a low resolution store for storing said block signals.

4. A method for processing a screened colour separation, the method comprising scanning said screened separation at a resolution higher than the screen ruling to generate a binary value for each high resolution pixel of said separation; generating signals representing single values for respective blocks of said high resolution pixels from said binary values in said blocks; and descreening the resultant low resolution version of said separation.

5. A method according to claim 4, wherein said blocks of high resolution pixels abut one another.

6. A method according to claim 4, wherein said binary values in each block are summed to generate the resultant single value for the block.

* * * * *